United States Patent Office 3,654,264
Patented Apr. 4, 1972

---

3,654,264
N-CYCLOHEXYL-3-GUANIDINOAZETIDINE
Tetsuya Okutani and Akinobu Nagaoka, Osaka, Japan, assignors to Takeda Chemical Industries, Ltd., Higashi-ku, Osaka, Japan
No Drawing. Filed Feb. 3, 1970, Ser. No. 8,428
Claims priority, application Japan, Feb. 11, 1969, 44/9,954
Int. Cl. A61k *27/00;* C07d *25/00*
U.S. Cl. 260—239 A  3 Claims

ABSTRACT OF THE DISCLOSURE

N-cyclohexyl-3-guanidinoazetidine and salts thereof are useful as hypertensive agents.

---

The present invention is concerned with N-cyclohexyl-3-guanidinoazetidine and pharmaceutically acceptable salts which compound and salts are useful as antihypertensive agents. The invention also relates to a method for the production of the compound.

N-cyclohexyl-3-guanidinoazetidine of the formula

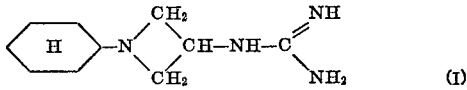
(I)

and its pharmaceutically acceptable salts have been found to show low toxicity and a prolonged hypotensive action. The present invention is based on this finding.

Thus, the principal object of the present invention is to provide N-cyclohexyl-3-guanidinoazetidine or its pharmaceutically acceptable salts useful as potent antihypertensive agents with low toxicity. Another object of the present invention is to provide a method for the production of the compounds.

The pharmaceutically acceptable salts of the guanidinoazetidine compound are exemplified by acid addition salts with acids such as inorganic acids (e.g. hydrochloric acid, sulfuric acid, nitric acid, phosphoric acid, and the like and organic acids (e.g. propionic acid, glycolic acid, oxalic acid, malonic acid, maleic acid, malic acid, succinic acid, citric acid, benzoic acid, ascorbic acid, salicylic acid, mandelic acid, methanesulfonic acid, phenylsulfonic acid, tolylsulfonic acid, and the like.

The guanidinoazetidine compound of the present invention can be produced by reacting a compound of the general formula

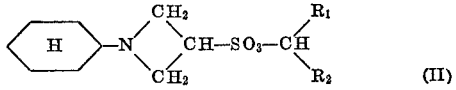
(II)

wherein $R_1$ and $R_2$ independently represent hydrogen, alkyl groups or aryl groups with guanidine.

Referring to the compound of Formula II, $R_1$ and $R_2$ denote hydrogen, alkyl groups (e.g. methyl, ethyl, propyl, butyl, pentyl, hexyl, octyl, decyl, benzyl and the like and aryl groups (e.g. phenyl and the like). Among the alkyl groups, the lower alkyls having 1 to 4 carbon atoms and benzyl are preferred.

The reaction is conducted preferably in the presence of a solvent such as methanol, ethanol, n-propanol, iso-propanol, n-butanol and other alcohols, and dioxane and other ethers. The reaction proceeds generally at room temperature, but may be accelerated by heating, if desired. Into the reaction system may be incorporated conventional tertiary amines.

By this reaction, an alkaline reaction mixture is generally obtained. To the mixture is added a suitable acid, followed by a conventional separation procedure (e.g. precipitation, concentration, etc.), whereby the object compound is recovered in the form of an acid addition salt. The salt is, upon necessity, converted into the corresponding free form by conventional means.

The compound of Formula II can be prepared by the reaction of a compound of the formula

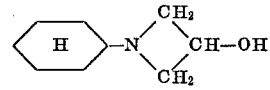

with a compound of the formula

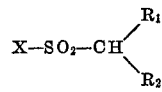

(wherein $R_1$ and $R_2$ have the same meaning as above) in the presence of a suitable solvent and a tertiary amine.

The guanidinoazetidine compound and its pharmaceutically acceptable salts can be used as an antihypertensive agents taking advantage of their prolonged hypotensive action and low toxicity.

The compound or its salts are orally or parenterally administrable per se or in a suitable form such as powder, granule, tablets or injection solutions admixed with a pharmaceutically acceptable carrier or adjuvant. The dose of the present compound or its salts varies depending on the kinds of the compounds, severity of the disease, etc., and generally falls within a range of 10 to 200 mg. upon oral administration, and 5 to 20 mg. upon parenteral administration for human adult per day.

In the following example, "part" means "weight parts," unless otherwise stated, and the relation between weight part and volume part is the same as that between "gram" and "milliliter."

EXAMPLE 1

1.86 part of guanidine hydrochloride is added to 0.45 part of sodium metal dissolved in 30 volume parts of isopropanol, followed by heating under reflux for 30 minutes. Precipitating sodium chloride is removed by filtration and to the filtrate is added 2.27 parts of N-cyclohexyl-3-methylsulfonyloxyazetidine. The mixture is stirred at room temperature, kept standing at this temperature overnight and heated at 40 to 45° C. for 1 hour. After cooling, precipitating guanidine methanesulfonate is removed by filtration and to the filtrate is added under cooling concentrated sulfuric acid. The precipitates are recovered by filtration to give 2.9 parts of crude N-cyclohexyl-3-guanidinoazetidine sulfate as colorless crystals. Recrystallization from a mixture of water and ethanol gives 1.44 part of flakes melting at 214 to 215° C. (decomposition).

*Elementary analysis.*—$C_{10}H_{20}N_4H_2SO_4 2H_2O$ (molecular weight: 330.41). Calculated (percent): C, 36.35; H, 7.93; N, 16.96; S, 9.70. Found (percent): C, 36.46; H, 7.83; N, 17.12; S, 9.71.

The use of oxalic acid in place of sulfuric acid in the above procedure gives N-cyclohexyl-3-guanidinoazetidine oxalate melting at 125 to 127° C. (decomposition).

*Elementary analysis.*—$C_{10}H_{20}N_4C_2H_2O_4$ (molecular weight: 286.33). Calculated (percent): C, 50.33; H, 7.74; N, 19.57. Found (percent): C, 50.21; H, 7.56; N, 19.73.

In the above procedure, when using N-cyclohexyl-3-ethylsulfonyloxyazetidine, N-cyclohexyl-3-butylsulfonyloxyazetidine or N-cyclohexyl-3-benzylsulfonyloxyazetidine in place of N-cyclohexyl-3-methylsulfonyloxyazetidine, substantially the same result as above is obtained.

What is claimed is:

1. A member of the group consisting of N-cyclohexyl-3-guanidinoazetidine and a pharmaceutically acceptable salt thereof.

2. A compound as in claim 1, said compound being N-cyclohexyl-3-guanidinoazetidine sulfate.

3. A compound as in claim 1, said compound being N-cyclohexyl-3-guanidinoazetidine oxalate.

References Cited

Houben-Weyl, Methoden Der Organischen Chemie, Vierte Auflage, vol. 11/1, (Stuttgart, 1957), pp. 217–222.

Smith, Open Chain Nitrogen Compounds, vol. 1, (New York, 1965), p. 279.

ALTON D. ROLLINS, Primary Examiner

U.S. Cl. X.R.

424—244